F. G. WHEELER.
EVAPORATING PROCESS AND APPARATUS.
APPLICATION FILED JUNE 17, 1916.
1,222,340.
Patented Apr. 10, 1917.
2 SHEETS—SHEET 1.
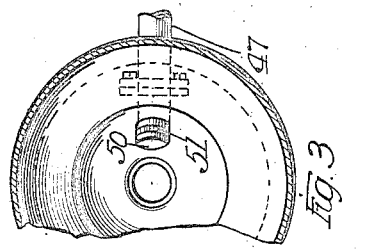
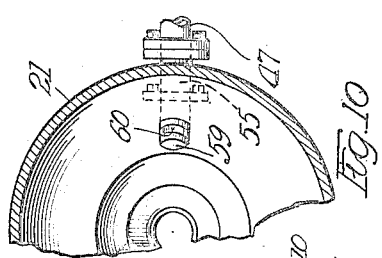
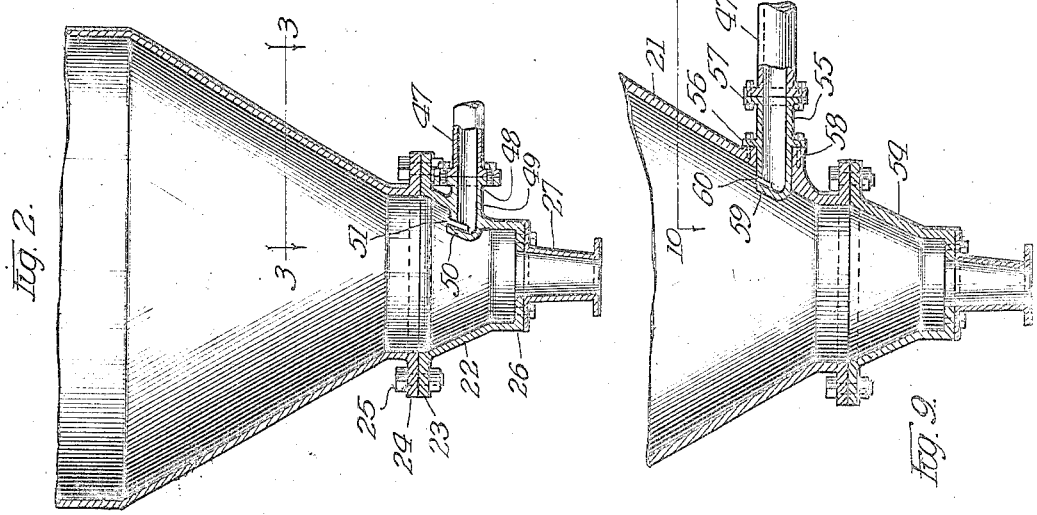
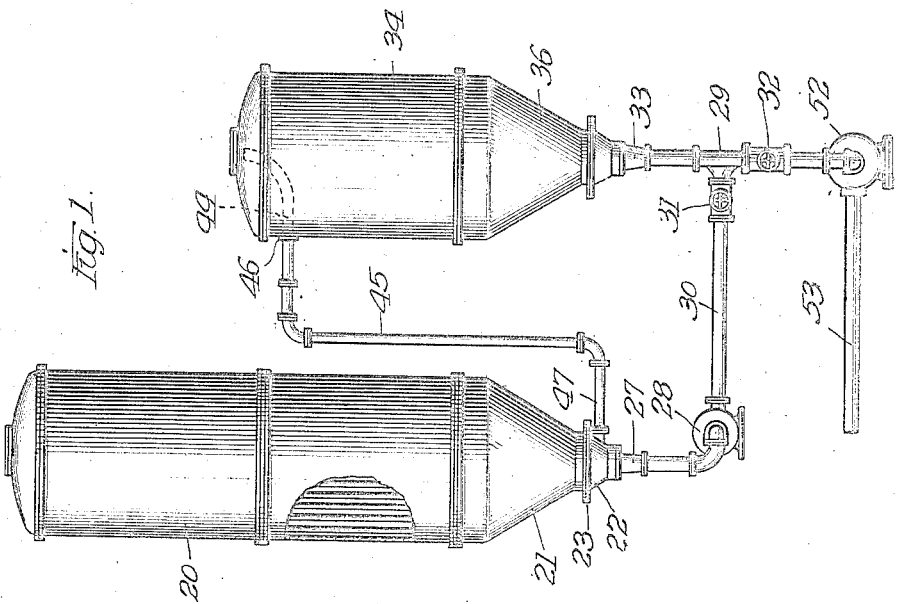
Witnesses
Inventor
Frank G. Wheeler.
By Offield Towle Graves & Offield
Attys.

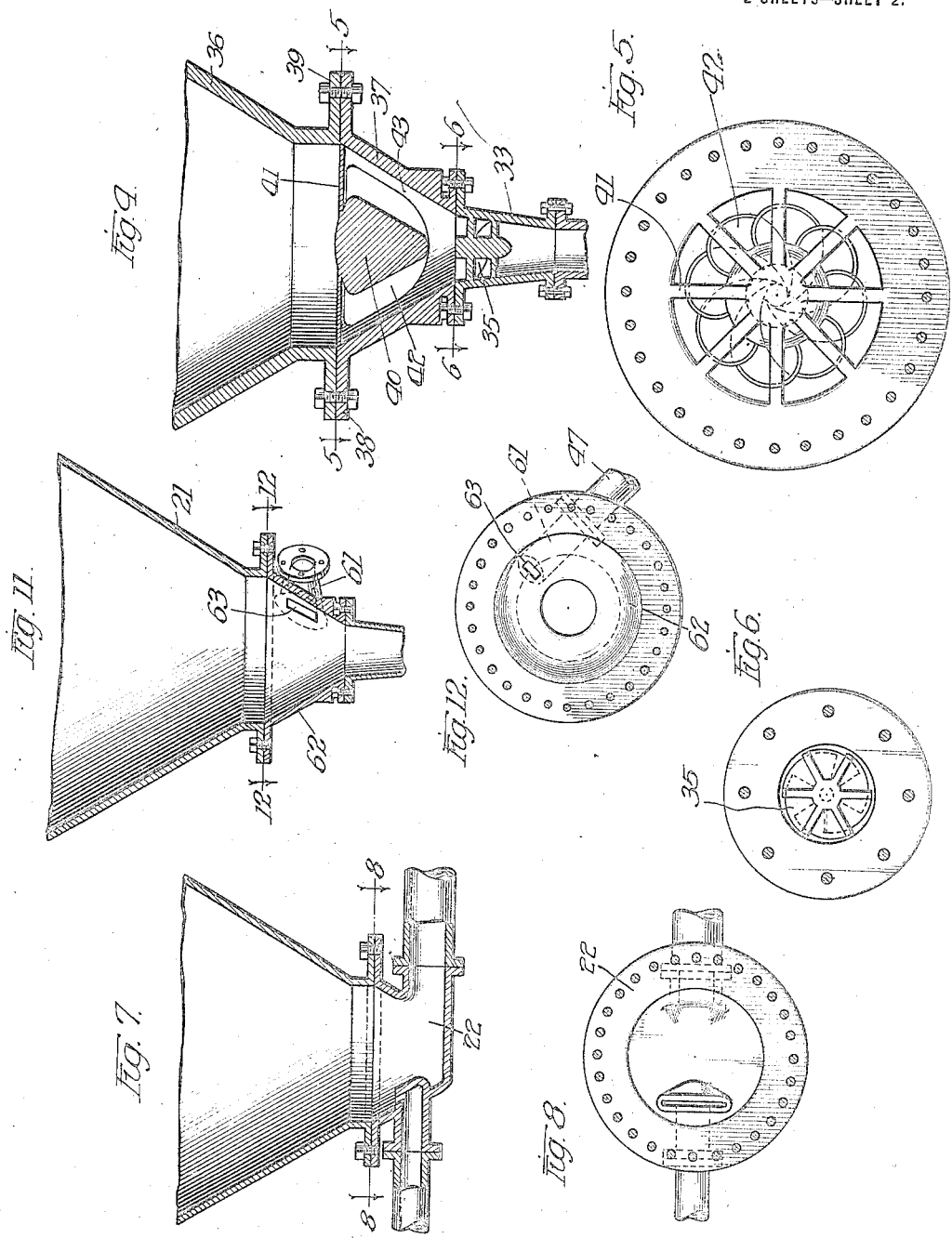

UNITED STATES PATENT OFFICE.

FRANK G. WHEELER, OF APPLETON, WISCONSIN, ASSIGNOR TO BLEACH PROCESS COMPANY, OF APPLETON, WISCONSIN, A CORPORATION OF WISCONSIN.

EVAPORATING PROCESS AND APPARATUS.

1,222,340.  Specification of Letters Patent.  Patented Apr. 10, 1917.

Application filed June 17, 1916. Serial No. 104,297.

*To all whom it may concern:*

Be it known that I, FRANK G. WHEELER, a citizen of the United States, residing in the city of Appleton, county of Outagamie, and State of Wisconsin, have invented certain new and useful Improvements in Evaporating Processes and Apparatus, of which the following is a specification.

My invention relates to evaporating processes and apparatus, and, although capable of many applications, is particularly well adapted for separating salts from liquids in which they are in solution. As a specific application of my invention, I shall describe my invention as employed in removing the common salt constituent from a water solution of sodium chlorid and another soluble salt, such as sodium hydrate, the solution being one such as may be obtained by electrolyzing ordinary brine.

In some of the modern types of electrolytic cells in order to gain a high efficiency it is advisable to push the flow of brine considerably beyond an amount equal to the quantity which is actually electrolyzed, so that the resultant liquor coming from the cell may contain 150% as much undecomposed sodium chlorid as its sodium hydrate content. In order to remove the surplus chlorid from the cell liquor, advantage is taken of the fact that sodium hydrate is more soluble in water than sodium chlorid. That is to say, it is possible by concentrating the briny liquor to cause the sodium chlorid to crystallize and separate out, while the sodium hydrate remains in solution.

For concentrating the liquor so as to permit the common salt to crystallize out of the solution, it is customary to employ an evaporating pan which is usually of the vacuum type and in the trade is known as an "effect". To gain efficiency and economy, two or more pans or effects may be connected in series so as to cause evaporation and concentration of the liquor in two or more stages, the result, however, so far as my invention is concerned, being the same as when a single effect is employed.

The removal or separation of the crystallized sodium chlorid from the concentrated sodium hydrate liquor, which is the end product of the effect, presents a great deal of difficulty on account of the fact that the salt crystals accumulate in large quantities at the bottom of the liquor in the effect and very often clog up the apparatus and render it inoperative until the accumulations have been cleared away. Several schemes have been proposed in order to eliminate this clogging and to rapidly and efficiently remove the salt crystals as they are formed. However, all of these schemes, so far as I am aware, contemplate the mechanical or manual handling of the liquor-soaked salt crystals, which is disadvantageous on account of the corrosive effect of the sodium hydrate adhering to the crystals. My invention is designed to overcome all of these difficulties, as will hereinafter appear.

Among the salient objects of the invention are, to provide a process and apparatus by which the salt crystals are removed from the effect while suspended in a stream of liquor which is afterward returned to the effect minus the crystals which have been separated out in my improved apparatus; to provide a system in which the brine is kept continually in circulation through the separating apparatus; to provide a system in which the circulation of the liquor itself is utilized to separate the crystals from the liquor carrying them; to provide a system so organized that the liquid contents of the effect may be utilized in order to wash out the crystals from the separating apparatus; to provide a system in which the crystals which are removed from the separator are retained in the liquor in suspension so that there is no possibility of clogging the evaporating or separating apparatus while evaporation or separation is taking place; to provide a system so organized that the salt crystals when finally discharged from the apparatus are mixed or suspended in liquid, thereby enabling a pump or similar means to be used for removing the crystals for subsequent treatment in leaching tanks or other apparatus; to provide an apparatus which is capable of being operated rapidly, efficiently, and economically in connection with the apparatus used for subsequent treatment of the caustic liquor and salt crystals; to provide an apparatus which can be constructed rapidly and economically and which may be maintained, repaired, or renewed with a minimum expenditure of money, time or labor; to provide an apparatus of the class described so organized that such parts as are subject to more than ordinary corrosion and wear may be rapidly and economically replaced; and, in general, to provide an improved process and apparatus of the character referred to.

In the drawings which illustrate the application of my invention to apparatus for evaporating a solution containing sodium chlorid and sodium hydrate and for separating the sodium chlorid from the hydrate—

Figure 1 is an elevation of the apparatus;

Fig. 2 is a sectional view of the bottom of the effect shown in Fig. 1;

Fig. 3 is a fragmentary section taken on the line 3—3 of Fig. 2;

Fig. 4 is a section of the bottom end of the separator shown in Fig. 1;

Fig. 5 is a section taken on the line 5—5 of Fig. 4;

Fig. 6 is a section taken on the line 6—6 of Fig. 4;

Fig. 7 is a view similar to Fig. 2, but showing a slightly modified form of apparatus arranged for a side discharge;

Fig. 8 is a section taken on the line 8—8 of Fig. 7;

Fig. 9 is a view similar to Fig. 2, but showing a modified construction;

Fig. 10 is a section taken on the line 10—10 of Fig. 9;

Fig. 11 is a view similar to Fig. 2, showing a further modification; and

Fig. 12 is a section taken on the line 12—12 of Fig. 11.

Referring to the drawings, 20 represents a vacuum evaporating pan or effect of conventional design which is heated by steam in the usual manner and which is exhausted by the well known vacuum pumps or suction apparatus which forms no part of this invention. The bottom cone 21 of the effect is equipped at its lower end with a flanged cast iron fitting 22 having an upper flange 23 for attachment to the bottom flange 24 of the effect by suitable bolts 25, together with a bottom flange portion 26 to which the outlet 27 is bolted. The outlet 27 leads into the suction or inlet of a pump 28 which is constantly driven by a suitable electric motor, not shown. The outlet or discharge end of said pump 28 is connected with a T-shaped fitting 29 through a pipe 30 and gate valve 31. The lower end of said T-shaped fitting 29 is normally closed by a valve 32 and the upper end thereof leads into the distributing nozzle 33 at the lower end of the separator 34.

As shown in Figs. 4 and 6, said distributing nozzle 33 is a cast iron fitting, the upper end of which may be somewhat larger in diameter than the lower end and in which is arranged a series of inclined guide blades 35. In order to spread the fluid issuing from the upper end of the distributing nozzle 33, I interpose between the bottom cone 36 of the separator a cone-shaped spreader chamber 37 to the bottom end of which is bolted the larger or upper flanged end of the distributing nozzle 33. The upper end of the spreader chamber 37 is flanged, as shown at 38, so that it may readily be bolted to the flange 39 on the lower end of the separator cone 34. Located centrally of the cone-shaped spreader chamber 37 is a solid cone-shaped body of metal 40 which is supported by a plurality of spider arms 41 either cast integrally with or suitably connected to the upper part of the spreader chamber 37. Surrounding the cone 40 are a series of inclined spirally arranged spreader vanes 42 which as a whole occupy a space slightly less than the cone-shaped interior of the spreader chamber 37, so that a space 43 is provided between the outer edges of the vanes and the wall of the spreader chamber. The combined effect of the distributing nozzle 33 with its guide blades and the spreader chamber 37 with its spreader vanes and spreader cone, is such that the stream of upwardly flowing liquor coming from the pump 28 is broken up and ascends in a current distributed over a large area of the cone 36 and having a velocity greatly inferior to that of the velocity of flow in the pipe 30, due to the pressure of the pump 28.

In the interior and at the upper part of the separator 34 I insert a curved discharge pipe 44 having its upper end open and having its lower end connected to a pipe 45 leading into the bottom of the evaporator. It should be understood that the pipe 44 is provided with a suitable flanged portion 46 secured to the side of the separator so as to prevent leakage of the liquor which normally fills the separator.

In the particular form shown in Figs. 1, 2 and 3, the lower end of the return pipe 45 has a horizontal extension 47 the end of which is flanged to bolt onto an integral flange 48 formed on the side of the fitting 22. As shown in Fig. 2, the inner end of the flanged inlet conduit 49 is equipped with a baffle plate 50 which prevents interference with the descending solution in which the salt crystals are suspended. The baffle plate 50 at the same time provides an arc-shaped discharge slot 51 which properly distributes the incoming purified liquor.

Describing the operation of the system, the cell liquor carrying the common salt and sodium hydrate in solution is introduced into the evaporator 20 and the pump 28 started so as to fill up the separator 34 with the same solution. The pump 28 is kept continuously in operation so long as the liquor is being evaporated in the effect. After the evaporation has been proceeding in the effect for some time, the liquor is concentrated to such an extent that the common salt commences to crystallize out, the crystals, which are of a higher specific gravity than the solution, falling into the cone 21 from whence they pass by way of the fitting 22 and outlet 27 to the pump 28. The pump 28, which is continuously operated during the time that evaporation is taking place, forces the crystal-bearing solution through the distributer 33 and spreader chamber 37. The speed of the pump 28 is such that the velocity of flow through the piping does not permit the crystals to settle and they are carried along up through the distributer and spreader and into the cone 36 of the separator. As soon, however, as they reach the neighborhood of the upper part of the cone 36, the velocity of flow of the liquor is so much reduced that the normal rate of descent of the crystals, due to their higher specific gravity, becomes equal to the velocity of upward flow, whereupon the crystals remain stationary in the lower part of the separator or the upper part of the cone 36, the liquor above this zone being practically free from salt crystals. The pipes 44, 45 and 46 serve to return the crystal-freed liquor to the effect, where it is further concentrated by evaporation, the circulation through the separator being continuous so long as evaporation is going on.

Whenever the evaporation has been carried on for such a length of time that the liquor is practically free from salt in solution, evaporation is discontinued and the entire contents of the separator and evaporator are withdrawn from the apparatus. This is accomplished by closing the valve 31 after the pump 28 has been stopped and opening up the valve 32 which up to this time has been kept closed. The pump 52, the suction end of which is connected to the valve 32, is then started up, the effect being to suck out the entire contents of the separator and the evaporator, the discharge of the pump leading to the discharge pipe 53 which conducts the crystals and liquor to leaching tanks or other apparatus for subsequent treatment. It should be noted that the contents of the separator are the first to be discharged, the top of the separator filling up with liquor from the evaporator through the pipe 45 which keeps the separator full so long as the baffle plate 50 and slot 51 are covered with liquor. After all of the liquor has been sucked out of the evaporator through the pipe 45, the clear liquor which is then in the separator is finally sucked out and while being discharged by the pump 52 thoroughly washes out of the separator and associated parts any crystals which may have lodged in the piping.

It will be seen that the locating of the return inlet 51 at the lower end of the evaporator cone accomplishes two objects: In the first place, it enables the entire contents of the evaporator to be withdrawn following the contents of the separator without the provision of extra valves, piping, or other apparatus; and in the second place, which is more important, the clear liquor, which has a lower boiling point than the liquor in the evaporator, is admitted at a point of high pressure (due to the hydrostatic head in the evaporator) so that there is no tendency for it to create a disturbance on the surface of the liquor in the evaporator by violent ebullition.

In Figs. 7 and 8 I have illustrated a bottom fitting 22 for the evaporator cone suitable for a side discharge instead of a bottom discharge, as in the preferred form described. In other respects the fitting is substantially similar.

In Figs. 9 and 10 I have shown a cast iron fitting of the downward discharge type, together with an inlet nozzle which, instead of being inserted in the fitting 54, is placed at the lower end and in the side of the evaporator cone 21. As shown in Fig. 9, said removable inlet nozzle 55 comprises a single integral casting having a pair of flanges 56 and 57 for attachment, respectively, to the side of the evaporator cone and the return pipe 47. The inner end of the nozzle fitting 55 extends through a cylindrical aperture bored in a projection 58 cast on the side of the evaporator cone, and is formed with a baffle plate 59 and delivery slot 60 similar in function to the baffle plate 50 and the slot 51, shown in Figs. 2 and 3.

In Figs. 11 and 12 is shown still another modification of the return delivery parts associated with the evaporator cone 21. In said further modification the valve liquor is admitted through the pipe 47 into a flanged tangentially arranged branch pipe 61 formed as an integral part of the casting 62 and opening into the interior of the cone-shaped casting 62 through a slot 63 extending upwardly along the side of the cone. The effect of the tangential arrangement of the branch pipe 61 and the shape of the slot 63 is to cause the pure liquor returned from the separator to ascend gradually up through the evaporator cone in a spiral stream which increases in diameter and gradually merges with the body of liquid in the effect.

Although I have described what I consider to be a preferred embodiment of my invention for the particular application herein described, it should be understood that the details of construction may be modified considerably without any sacrifice of efficiency. For instance, I may dispense with the guide blades in the distributer nozzle and rely solely on the vane arrangement in the spreader cone, or I may use a cone having no spreader vanes therein and rely upon the guide blades in the distributer. Other modifications of the invention will be apparent to those skilled in the art, in view of the herein description of my improvements. The invention is also capable of being employed in fields other than that particularly specified. The scope of the invention must therefore be determined by reference to the appended claims.

I claim—

1. The improved step in the process of removing a solute from a solution thereof, which consists in acting upon the solution to remove a portion of the solvent whereby the solute is caused to crystallize, and causing the solution carrying the crystals to flow upwardly in a stream which increases in area and decreases in velocity, thereby causing the crystals to become suspended in the low velocity part of the stream because of their higher specific gravity.

2. The improved step in the process of removing a solute from a solution thereof, which consists in acting upon the solution to remove a portion of the solvent whereby the solute is caused to crystallize, and then causing the solution carrying the crystals to flow upwardly in a stream which increases in area and decreases in velocity, thereby causing the crystals to become suspended in the low velocity part of the stream because of their higher specific gravity, and removing the clear liquor above the suspended crystals to be re-treated as many times as desired.

3. The improved step in the process of removing a solute from a solution containing two different solutes, which consists in subjecting the solution to combined low pressure and heat and thereby removing a portion of the solvent and causing one of said solutes to crystallize, removing the solution from the influence of the heat and low pressure, causing it to flow upwardly in a stream which increases in area and decreases in velocity, thereby causing the crystals to become suspended in the low velocity portion of the stream, due to their high specific gravity, and subsequently returning the clear liquor to be re-treated by the heat and pressure means.

4. The improved step in the process of removing common salt from a solution of common salt and sodium hydrate, which consists in evaporating the solution to crystallize out the salt and at the same time circulating the solution, part of the circulation path being upwardly directed and relatively enlarged in cross sectional area and reduced in velocity, whereby the crystals of salt, by virtue of their high specific gravity, are caused to become suspended in said enlargement.

5. In an apparatus of the class described, the combination of a separating receptacle having at its low end a downwardly tapering part terminating in a bottom inlet port, and an effect communicating with the top of said receptacle and having an outlet for conducting concentrated crystal-bearing liquor to the receptacle inlet.

6. In an apparatus of the class described, the combination of a separating receptacle having at its low end a downwardly tapering part terminating in a bottom inlet port, an effect communicating with the top of said receptacle and having an outlet for conducting concentrated crystal-bearing liquor to the receptacle inlet, and a pump for effecting a continuous circulation upwardly through said separating receptacle.

7. In apparatus of the class described, the combination of a vertical separating receptacle having an outlet at its upper end and a downwardly tapering part at its lower end with an inlet at the bottom, an effect, a conduit for leading crystal-bearing liquor from the effect to the bottom of said receptacle, and a conduit for connecting the top of said receptacle with the lower end of the effect.

8. In apparatus of the class described, the combination of a vertical effect having a discharge port at its lower end, a vertical settling tank having at its lower end an inlet port of area increasing upwardly in the direction of flow, a pipe connecting the discharge port of the effect with the inlet of the receptacle for conducting crystal-carrying solution into the separator, a return pipe leading from the top of the separator to the bottom of the effect, and a circulating pump included in one of said pipes.

9. In apparatus of the class described, the combination of a vertical effect having a discharge port at its lower end, a vertical settling tank having at its lower end an inlet port of area increasing upwardly in the direction of flow, a pipe connecting the discharge port of the effect with the inlet of the receptacle for conducting crystal-carrying solution into the separator, a return pipe leading from the top of the separator to the bottom of the effect, a circulating pump included in one of said pipes, and means connected with the end of said return pipe for directing the return flow of liquor in a path distinct from the path of the solution discharged from the effect.

10. In aparatus of the class described, the combination of a vertical effect having a discharge port at its lower end, a vertical settling tank having at its lower end an inlet port of area increasing upwardly in the direction of flow, a pipe connecting the discharge port of the effect with the inlet of the receptacle for conducting crystal-carrying solution into the separator, a return pipe leading from the top of the separator to the bottom of the effect, a circulating pump included in one of said pipes, and means connected with the end of said return pipe for directing the return flow of liquor in a path contiguous to the wall of the effect.

11. In apparatus of the class described, the combination of a vertical effect having a discharge port at its lower end, a vertical settling tank having at its lower end an inlet port of area increasing upwardly in the direction of flow, a pipe connecting the discharge port of the effect with the inlet of the receptacle for conducting crystal-carrying solution into the separator, a return pipe leading from the top of the separator to the bottom of the effect, a circulating pump included in one of said pipes, and removable means connected with the end of said return pipe for directing the return flow of liquor in a path contiguous to the wall of the effect.

12. In apparatus of the class described, the combination of an effect having a conical bottom terminating in a discharge port, a vertical separating tank having its lower end cone-shaped and provided with an inlet at the lower end of the cone, a conduit connecting the bottom of the effect cone with the bottom of the separator cone, a conduit connecting the effect with the top of the separator, and a circulating pump included in one of said conduits.

13. In apparatus of the class described, the combination of an effect having a conical bottom terminating in a discharge port, a vertical separating tank having its lower end cone-shaped and provided with an inlet at the lower end of the cone, a conduit connecting the bottom of the effect cone with the bottom of the separator cone, a conduit connecting the effect with the top of the separator, a circulating pump included in one of said conduits, and means for causing the upward flow of solution through the inlet of said separator to become distributed throughout the area of the separator cone.

14. In apparatus of the class described, the combination of an effect having a conical bottom terminating in a discharge port, a vertical separating tank having its lower end cone-shaped and provided with an inlet at the lower end of the cone, a conduit connecting the bottom of the effect cone with the bottom of the separator cone, a conduit connecting the effect with the top of the separator, a circulating pump included in one of said conduits, and a plurality of vanes centrally arranged in the bottom of the separator cone to cause a spreading of the upward flow of the solution throughout the area of said cone.

15. The improved step in the art of removing a solute from a solution containing two different solutes, one of which is of greater solubility in the solution than the other, which consists in subjecting the solution to heat and thereby causing the less soluble solute to crystallize, temporarily removing a portion of the crystal-bearing solution from the main body of the solution, and causing it to flow upwardly in a stream which increases in area and decreases in velocity, thereby causing the crystals to become suspended in the low velocity portion of the stream, due to their high specific gravity.

16. The improvement in the art of removing a solute from a solution containing two different solutes, one of which is of greater solubility in the solution than the other, which consists in subjecting the solution to heat and thereby causing the less soluble solute to crystallize, temporarily removing a portion of the crystal-bearing solution, causing it to flow upwardly in a stream which increases in area and decreases in velocity, thereby causing the crystals to become suspended in the low velocity portion of the stream, due to their high specific gravity, subsequently returning the supernatant liquor to the main body of the solution, continuing the above mentioned steps in the process until the major portion of the less soluble solute has become crystallized and suspended in the upward flowing stream, and finally removing the suspended crystals.

FRANK G. WHEELER.

Witnesses:
S. R. STILP,
SELMA WIGGERS.